(12) United States Patent
Efremov

(10) Patent No.: US 11,474,895 B2
(45) Date of Patent: Oct. 18, 2022

(54) SYSTEM AND METHOD OF ASYNCHRONOUS SELECTION OF COMPATIBLE COMPONENTS

(71) Applicant: AO Kaspersky Lab, Moscow (RU)

(72) Inventor: Andrey A. Efremov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 146 days.

(21) Appl. No.: 16/502,184

(22) Filed: Jul. 3, 2019

(65) Prior Publication Data

US 2020/0310905 A1 Oct. 1, 2020

(30) Foreign Application Priority Data

Mar. 29, 2019 (RU) ................................ 2019109172

(51) Int. Cl.
| | | |
|---|---|---|
| *G06F 11/00* | (2006.01) | |
| *G06F 11/07* | (2006.01) | |
| *H04L 41/0654* | (2022.01) | |
| *G06N 3/08* | (2006.01) | |

(52) U.S. Cl.
CPC ...... *G06F 11/0793* (2013.01); *G06F 11/0706* (2013.01); *G06F 11/079* (2013.01); *G06F 11/0781* (2013.01); *G06N 3/08* (2013.01); *H04L 41/0654* (2013.01)

(58) Field of Classification Search
CPC . G06N 20/00; H04L 67/1097; H04L 41/0893; H04L 41/16; H04L 47/822; G06F 11/3055; G06F 2201/81; G06F 2221/2115
See application file for complete search history.

(56) References Cited

U.S. PATENT DOCUMENTS

| | | | |
|---|---|---|---|
| 6,687,847 B1 * | 2/2004 | Aguilera ............. | G06F 11/0715 714/15 |
| 8,356,075 B2 * | 1/2013 | Balko ..................... | G06F 9/452 709/204 |
| 8,661,547 B1 * | 2/2014 | Kononov ............ | H04L 63/1408 726/24 |
| 9,092,802 B1 * | 7/2015 | Akella ............... | G06Q 30/0256 |
| 9,710,817 B2 | 7/2017 | Vaidyanathan et al. | |
| 9,887,889 B1 * | 2/2018 | Dippenaar .......... | H04L 43/0817 |
| 10,187,326 B1 * | 1/2019 | Anand .................... | H04L 43/08 |

(Continued)

FOREIGN PATENT DOCUMENTS

WO 2018198111 A1 11/2018

*Primary Examiner* — Loan L. T. Truong
(74) *Attorney, Agent, or Firm* — ArentFox Schiff LLP; Michael Fainberg

(57) ABSTRACT

Systems and methods are presented for selection of compatible components for an observed system. An exemplary method comprises collecting parameters of one or more components of the system, assessing conformity of the one or more components of the system with a required state of the system, identifying one or more anomalies based on the assessment of conformity, analyzing the one or more anomalies to identify a class and parameters of the system corresponding to the one or more anomalies, determining one or more models of methods of restoration of the system, selecting one or more components that meets requirements of the one or more models of methods of restoration and implementing the one or more components in the system that are compatible with the system to eliminate the one or more anomalies.

13 Claims, 10 Drawing Sheets

(56) References Cited

U.S. PATENT DOCUMENTS

| | | | |
|---|---|---|---|
| 10,198,327 B1* | 2/2019 | Gopinath | G06F 11/1464 |
| 10,459,827 B1* | 10/2019 | Aghdaie | A63F 13/67 |
| 10,498,815 B2* | 12/2019 | Desai | H04L 43/04 |
| 10,872,149 B1* | 12/2020 | Alexander | G06F 21/566 |
| 10,965,563 B2* | 3/2021 | Subramoni | H04L 43/08 |
| 11,113,143 B2* | 9/2021 | Efremov | G06F 11/0793 |
| 2005/0193225 A1 | 1/2005 | MacBeth et al. | |
| 2006/0288183 A1* | 12/2006 | Boaz | G06F 11/1451 |
| | | | 711/164 |
| 2007/0028219 A1 | 2/2007 | Miller et al. | |
| 2007/0124283 A1* | 5/2007 | Gotts | G06F 16/951 |
| 2007/0270993 A1* | 11/2007 | Onoshita | D06F 37/42 |
| | | | 700/218 |
| 2009/0299817 A1 | 12/2009 | Fok et al. | |
| 2009/0328209 A1* | 12/2009 | Nachenberg | H04L 63/1408 |
| | | | 726/22 |
| 2011/0083180 A1* | 4/2011 | Mashevsky | G06F 21/56 |
| | | | 726/23 |
| 2012/0041575 A1* | 2/2012 | Maeda | G05B 23/024 |
| | | | 700/80 |
| 2013/0091391 A1* | 4/2013 | Arndt | G06F 11/0754 |
| | | | 714/47.1 |
| 2014/0046645 A1* | 2/2014 | White | H04L 41/145 |
| | | | 703/13 |
| 2014/0244836 A1 | 8/2014 | Goel et al. | |
| 2015/0341379 A1* | 11/2015 | Lefebvre | H04W 12/08 |
| | | | 726/22 |
| 2016/0142435 A1* | 5/2016 | Bernstein | H04L 63/1441 |
| | | | 726/23 |
| 2016/0217022 A1* | 7/2016 | Velipasaoglu | G06F 11/0772 |
| 2016/0217056 A1* | 7/2016 | Chua | G06F 11/3006 |
| 2016/0254944 A1* | 9/2016 | Larsson | H04L 41/064 |
| | | | 370/230 |
| 2016/0359740 A1* | 12/2016 | Parandehgheibi | H04L 63/16 |
| 2017/0010931 A1* | 1/2017 | Agarwal | G06F 11/0727 |
| 2017/0060656 A1* | 3/2017 | Bhattacharya | G06Q 10/063 |
| 2017/0111378 A1* | 4/2017 | Caffrey | G06F 21/552 |
| 2017/0124782 A1* | 5/2017 | Amirapu | G06F 16/29 |
| 2017/0134415 A1* | 5/2017 | Muddu | H04L 63/1441 |
| 2017/0250855 A1* | 8/2017 | Patil | H04L 41/064 |
| 2018/0091369 A1* | 3/2018 | Cunningham | H04L 43/0888 |
| 2018/0091586 A1* | 3/2018 | Auradkar | H04L 67/1095 |
| 2018/0357556 A1 | 12/2018 | Rai et al. | |
| 2018/0373865 A1* | 12/2018 | Acar | G06F 21/552 |
| 2019/0036978 A1* | 1/2019 | Shulman-Peleg | H04L 63/205 |
| 2019/0138423 A1* | 5/2019 | Agerstam | H04L 41/142 |
| 2019/0306127 A1* | 10/2019 | Efremov | H04L 63/0442 |
| 2020/0019852 A1* | 1/2020 | Yoon | G06K 9/6284 |
| 2020/0019890 A1* | 1/2020 | Rossi | G06N 20/10 |
| 2020/0210271 A1* | 7/2020 | Efremov | G06F 11/0721 |
| 2020/0257747 A1* | 8/2020 | Efremov | G06F 16/9535 |
| 2020/0301775 A1* | 9/2020 | Efremov | H04L 41/0654 |
| 2021/0124628 A1* | 4/2021 | Ding | G06N 3/088 |

* cited by examiner

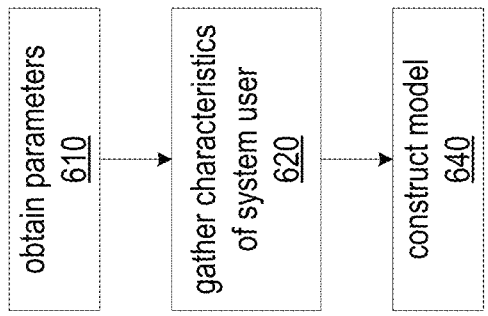
Fig. 6b
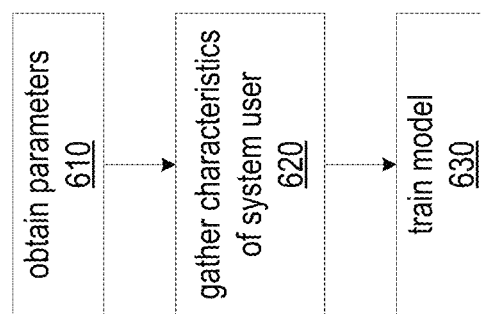
Fig. 6a
Fig. 6

SYSTEM AND METHOD OF ASYNCHRONOUS SELECTION OF COMPATIBLE COMPONENTS

CROSS-REFERENCE TO RELATED APPLICATIONS

This application claims benefit of priority under 35 U.S.C. 119(a)-(d) to a Russian Patent Application No. 2019109172 filed on Mar. 29, 2019, the contents of which is herein incorporated by reference in its entirety.

FIELD OF TECHNOLOGY

The present disclosure relates to malfunction detection in computer systems and more specifically to methods and systems of asynchronous selection of compatible components.

BACKGROUND

Companies and entrepreneurs often use advertising services in order to promote their products. Advertisement seeks to persuade potential customers to purchase a good, service or idea through various media channels. With the development of the Internet, advertisers now have expansive access to untapped markets to a point where it is estimated that more than 20% of advertising is conducted on the Internet.

However, advertising is not as effective as it could be, due to the lack of personalization and audience selection. Producers therefore strive to single out individual groups from the entire set of users and present advertising targeted to each group. This is known as targeted advertising, or advertising announcements (presentations) connected not to the content of a web page, but to a particular group of users, identified on the basis of their previous behavior or survey data.

During the course of the development of the Internet, the methods of delivering advertising to the user have themselves begun to change. The user has come to encounter advertising not only during surfing, but also in applications having access to the web and on information boards on the way to work or on the way home.

Advertising however has one major shortcoming: oftentimes it irritates a user who does not need the product being advertised. Such a user then seeks to avoid applications and web resources with advertising. If the user in fact needs the product, but the advertising is too intrusive, this may redirect the consumer to a competitor.

Thus, existing advertising products have low efficiency, and they gather, transmit information about, and profile the user, which may entail legal risks. Advertising often irritates the user who then avoids applications with advertising since the application is monetized through advertising. The proposed disclosure describes aspects that are free of these shortcomings.

SUMMARY

The present invention is designed for the asynchronous selection of compatible products.

The technical result of the present invention is to enable the selection of a system restoration means from a database of means as a result of carrying out a method of selection of system restoration means, in which system parameters describing states and processes (at least two states or two processes) are obtained from elements realizing the functionality of the system and the states and processes of the system are divided into anomalous and normal, by interrogating the state model of the system with the use of the parameters so obtained. The parameters can be obtained in real time, while the parameters themselves are obtained by a client installed on one of the elements of the system (the base element). The elements of the system may be software, hardware, hardware/software and organisms. The base elements in one particular instance may be personal computer devices which interact with IoT devices in the context of the system. In one particular instance, the system whose parameters are being obtained is dynamic and consists of elements unified by a wireless network, the number of elements connected to the base element being determined by the moment in time and the position in space of the base element and depending on the radius of the zone of coverage of the wireless station providing access to the current wireless network. By interrogating a state model, the correspondence with the requirements of the states and processes in the system and in its elements is assessed. The model may constitute: a set of rules for detecting:
    an anomalous state of the element, and is a function of the parameters of the element;
    an anomalous state of the system, and is a function of the parameters determining anomalous states of the elements of the system;
    an anomalous process of the element, and is a time function of the state of the element;
    an anomalous process of the system, and is a time function of the state of the system.

In another instance, the state model of the system is an aggregate of models of reliability and use cases. As a result of the interrogation of the model, the states and processes are divided into anomalous states/processes (in the general case, anomalies) and normal ones, during the division the system parameters of which the anomaly is a function may additionally be identified, where the anomaly may be at least:
    a state of an element deviating from the required state, and is a function of the parameters of the element;
    a state of the system deviating from the required state, and is a function of the state of an element;
    a process of an element deviating from the required process, and is a time function of the state of the element;
    a process of the system deviating from the required process, and is a time function of the state of the system;
    a state of the environment with which the system is interacting, deviating from the required state and describable by the parameters of the system;
    a process of the environment with which the system is interacting, deviating from the required process and describable by the parameters of the system.

Furthermore, the anomaly may be additionally described, for example, by a class or element of the system whose parameters define the anomaly. The anomaly detected may relate to anomalies of functioning, where an anomaly of functioning is a lowering or loss of the ability of the system or an element of the system to perform a predetermined function.

After the dividing up (clustering), at least one rule is formulated for the selection of the system restoration means on the basis of the parameters of the anomalous and normal states/processes of the system and a system restoration means is selected from the database of means on the basis of the at least one formulated rule. The selected means for system restoration, when implemented, ensures the conformity of the system and the elements to the requirements, while the restoration of the system itself is an assurance of conformity of the system to the design requirements, for example, the selected means ensures the restoration of the required functioning of the system when the anomaly occurred. In a particular instance, the selected means brings about the restoration by stabilizing the anomalous state or process, and the identification of the means for the stabilization of the deviation is performed in asynchronous mode, with dividing up of the states or processes.

In a particular case, the selected means for implementation performs the restoration by a transition of the element or system from the anomalous state or process to the required one (elimination of the anomaly), in which the required state or process in a particular instance corresponds to the requirements on the system per the FURPS+ classification. The steps of implementing the method relating to the dividing up of the processes and states, the formulation of rules and the selection of means may be performed at the server side.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

FIG. 6 shows a method of constructing models for searching for of users, according to exemplary aspects of the disclosure.

DETAILED DESCRIPTION

Figure 1:
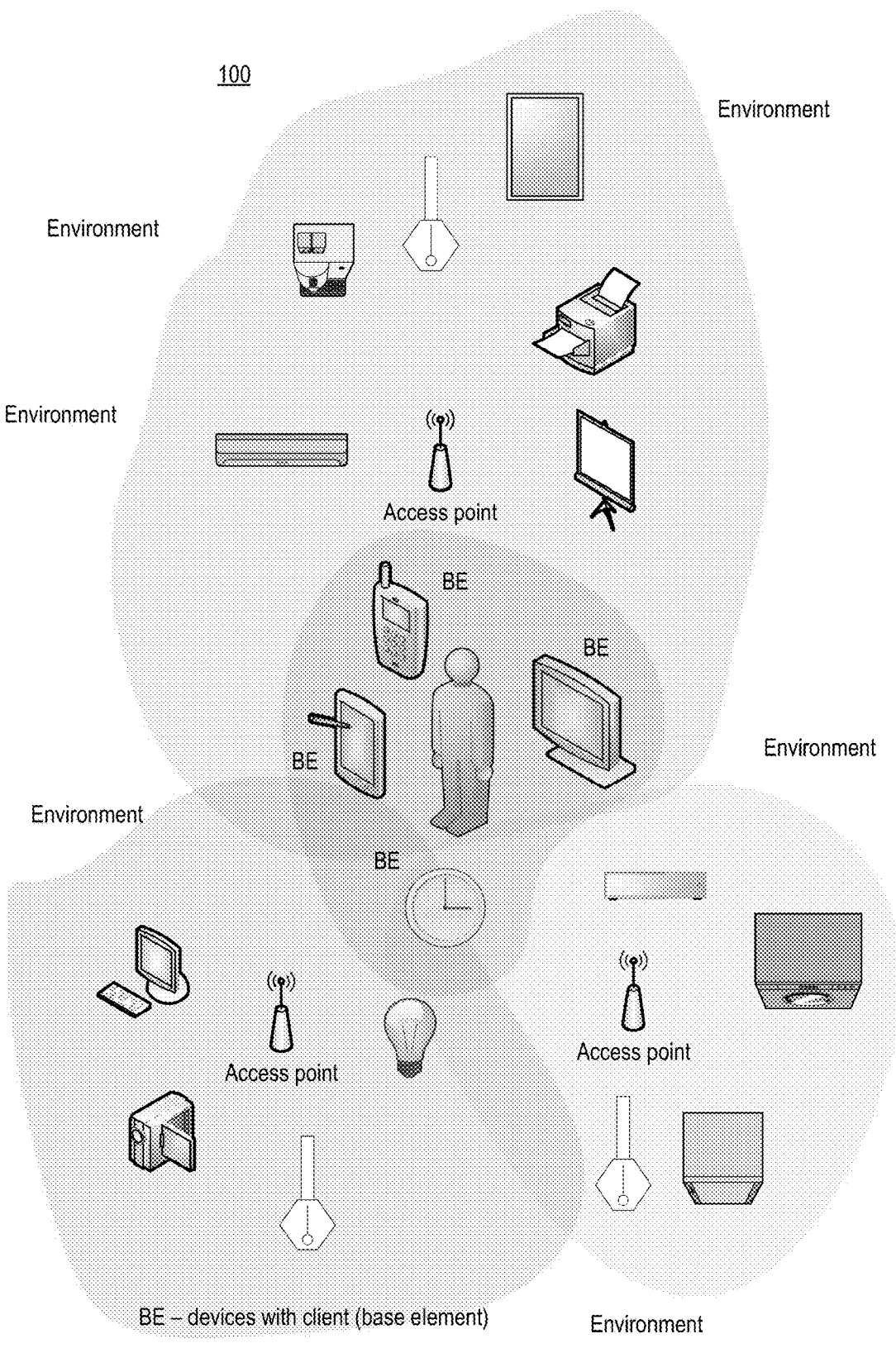
FIG. 1 shows a variant of an observable dynamic system, according to exemplary aspects of the disclosure.

Exemplary aspects are described herein in the context of a system, method, and computer program product of asynchronous selection of compatible components. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The present disclosure abandons the very essence of advertising, namely, its random nature, and advertising messages are transformed into a notification of the user as to a problem and the most effective methods for its solution. The invention makes it possible to avoid indeterminacy and probability, so that the present proposal cannot be considered advertising, it is a preventive system of user notification, which among other things reduces the resources spent on providing information, since it is carried out for those who actually need it. The advertising products determine the user preferences and probable needs, and send information to the user about the product or service which may be of interest to them, and which the user might need. The present invention monitors of the user's environment, discovers an actual problem (or its imminent occurrence) and an actual need, provides information about this, and proposes a possible solution which may be implemented, including by the acquisition of certain products or services.

The average user is not able to foresee many technical problems with devices, nor does the user have sufficient technical knowledge to assess the characteristics of a product in order to solve a problem which is occurring or has occurred, yet this information is in possession of the manufacturer. However, the manufacturer does not know the user who is in need of the product, and therefore is forced to carry out market research by probabilistic and statistical methods, and construct a demand model. The present disclosure is able to detect problems with a device and in its environment (including in the Internet of Things, or IoT), and is able to find an effective preventive solution to the problem. This system does not require the installing of additional means, but rather is realized by the active clients, for example, by antivirus software.

The present solution may be used at least to promote:
electronics,
IT providers,
IT services,
medical products,
healthcare providers,
health product and service promotion,
labor market products and services,
repair and construction materials and services,
cleaning services,
food products.

For example, this may be used in the setting of the labor market. One of the largest expenses of HR during recruiting is the search for a resume and the evaluation of its conformity to requirements. Given the lack of standards on filling out a resume, this takes up a lot of time. Sometimes the applicant has not entirely filled out their resume and/or has omitted important details, so that a relevant specialist might be passed over, or this entails additional labor expenses on the part of the recruiter to clarify the skipped items. The proposed invention makes it possible to evaluate certain requirements without their being indicated in the resume. The technology performs a categorization of specialists by means of a previously trained model based on data collected from the devices of applicants.

The following definitions and concepts will be used in describing variant aspects of the disclosure.

A system is a collection of elements which are related to and connected with each other, forming a definite whole or unity. A set of elements which are interacting in accordance with a design in which an element of the system may be another system, known as a subsystem; the system may be a controlling system or a controlled system and include hardware components (e.g. devices), software components (e.g. programs) and interaction with humans (thus, a human may be an element of the system) or with another biological organism. The elements are unified in such a way as to perform a shared functional task. Requirements are placed on the system by the design, e.g. per the FURPS+ classification:

F—functionality or functional requirements: properties, capabilities, security. These are the primary requirements, and are used to construct use case diagrams.

U—usability requirements or requirements on convenience of use (User Experience): the human factor, aesthetics, consistency, documentation.

R—reliability requirements or requirements on dependability: the frequency of possible crashes, fault resistance, restorability, predictability of stability.

P—performance requirements or requirements on productivity: response time, resource use, effectiveness, power, scalability.

S—supportability requirements or requirements on support: possibility of support, reparability, flexibility, modifiability, modularity, expandability, possibility of localization.

A system realized in accordance with a design should meet the design requirements during its functioning. A particular instance of requirements is the performance which the system/element should provide at a given moment in time (for example, requirements on frames per second or 100 requests per second from at least 10 users).

The state of an element of the system is the set of attributes of an element of the system at a moment in time, being a function of the parameters of the element.

The state of the system is the set of attributes of the system at a moment in time, being a function of the parameters of the system. It is also defined as the aggregate of states of the elements of the system at a moment in time.

A process is a change in the attributes of an element of the system or of the entire system in an interval of time, being a time function of the state.

A parameter (of an element, system, or process) is a quantity characterizing any attribute of a process, phenomenon, element (including a device, software, an organism) or system. Quantitatively, any system is described by an aggregate of quantities which can be broken down into two classes:

parameters (P), describing primary attributes of the system and being the initial data for the investigation of the system;

characteristics (C), describing secondary attributes of the system and being determined as functions of the parameters of the system: $C=f(P)$.

The parameters of the system are subdivided into:

internal, describing the structural and functional organization of the system;

external, describing the interaction of the system with the environment (in relation to the system).

The internal parameters include (though are not limited thereto):

structural parameters, describing the makeup of elements of the system and its actual structure;

functional parameters, describing the functional organization (the process of functioning) of the system.

The external parameters include (though are not limited thereto), for example, workload parameters, indicating how often the resources of the system are used and in what volume. In the general case, these are parameters of the interaction of the system with the environment.

The characteristics of the system are divided into:

global, showing the effectiveness of the functioning of the system as a whole;

local, describing the quality of the functioning of individual elements of the system.

The global characteristics of the system include (though are not limited thereto):

power characteristics or productivity characteristics, showing the speed of attaining the designated purpose of the system;

time characteristics, describing the time aspects of the functioning of the system;

reliability characteristics, defining the reliability of the functioning of the system;

economic characteristics in the form of cost indicators, showing the economic feasibility of the use of the system.

It is clear from the above that there is a technical distinction between a parameter and a characteristic. A characteristic is a function of at least one parameter. In the present application, parameters and characteristics are not distinguished however and the term "parameter" may be used for the former and the latter concept.

An anomaly is a deviation from requirements. The requirements may be design requirements, for example, for hardware/software complexes, or public health requirements. States and processes may deviate from the requirements. Accordingly, anomalous states and processes are distinguished. A particular instance of an anomalous process is a gradual failure, and a particular example of an anomalous state is a sudden failure or crash. Anomalies may be caused by a deviation from requirements of at least one parameter, that parameter also being an anomaly, or anomalous parameter.

A model is an abstract representation of reality in any form (for example, in mathematical, physical, symbolic, graphic or descriptive form), designed to represent certain aspects of that reality and making it possible to obtain responses to questions being studied. A model may describe states, processes, anomalies (anomalous states, processes, parameters), the specialist (user), and products (devices, software, services). The form may be expressed by using templates, conventional expressions, rules (mapping or projection of an input onto an output), neural nets, decision trees, and so forth.

A dynamic system is a system the number of whose elements is not constant but determined by the position in space of an element taken as a reference point (base element), and by a moment in time. For example, a dynamic system is one which consists of elements (realized in the form of hardware/software) unified by a wireless network, the number of elements connected to the base element being determined by the moment in time and the position in space of the base element and depending on the radius of the coverage zone of the wireless station providing access to the current wireless network. An example of a dynamic system 100 is shown in FIG. 1, which shall be described below.

Figure 2A:
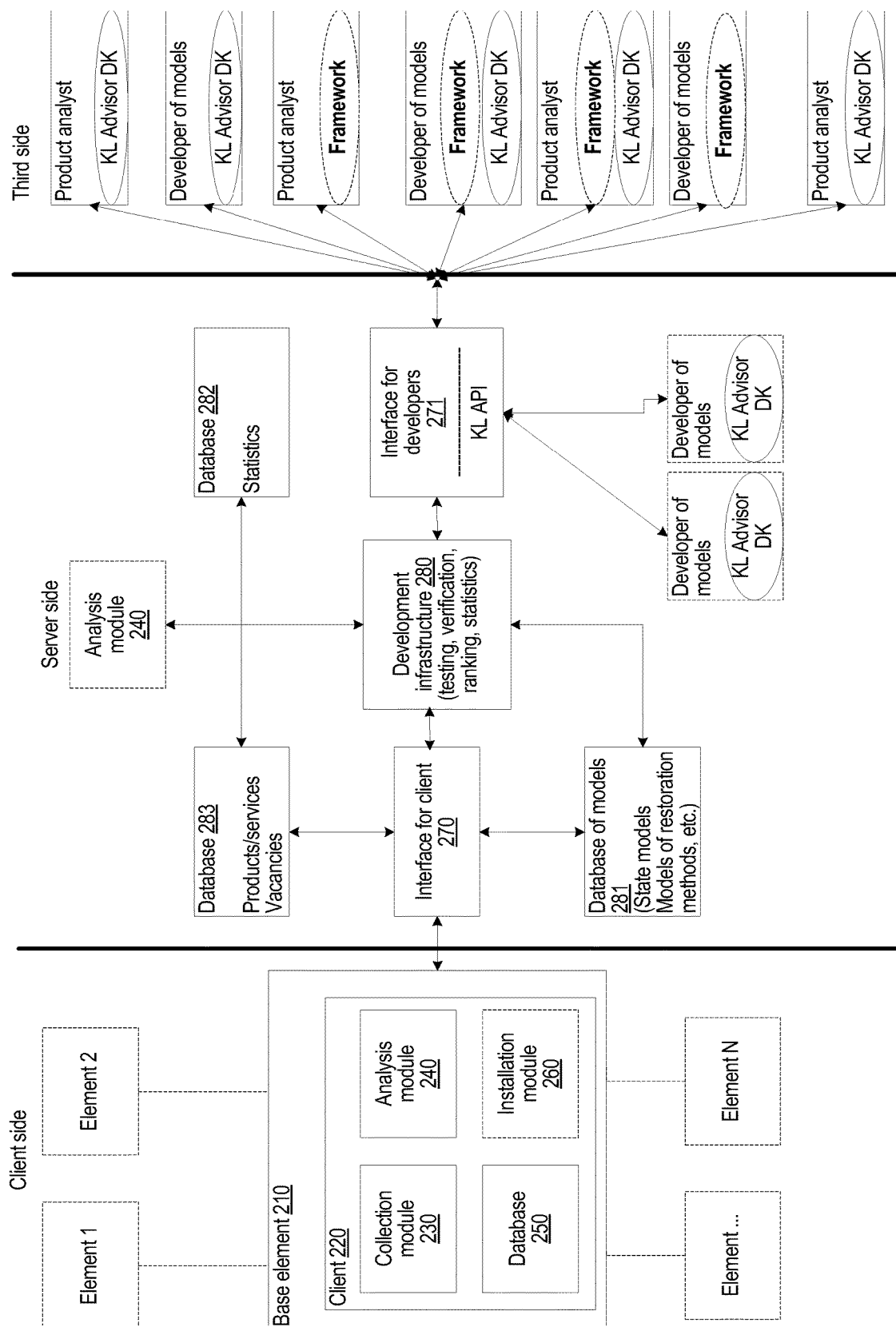
FIG. 2A shows a system of preventive interaction with a user, according to exemplary aspects of the disclosure.

FIG. 2A shows a system 200 of preventive interaction with a user. The system 200 includes a client side, a server side, and a third side. At the client side is situated the system 100 being observed, which includes at least one element 210 (the base element) of the system, with an installed client 220, where the client 220 is designed to collect parameters of the system and to interact with the server side. At the third side is situated software/hardware for the development of models, product descriptions/specifications, and so forth. The server side interacts with the client and obtains the developed models from the third side. At the server side, there occurs testing of the obtained models, ranking of them, gathering of statistics on the clients, generating of configuration files and their updating for the clients, and providing of an infrastructure for the development of the models.

The client includes a collection module 230, an analysis module 240, and a database 250. Optionally, the client may include an installation module 260. The collection module 230 is designed to gather the parameters of the system 100, telemetry parameters in one particular instance. The analysis module 240 transforms the parameters into states and processes and analyzes the parameters, states and processes to discover anomalies. In exemplary aspects, parameters are transformed into states and processes by models when the models are specified for every field of technology. In some aspects, the models are realized by neural network so random forest, for example. The analysis by the analysis module 240 is performed by means of interrogating the models, for example, the state models. This analysis module 240 also analyzes the anomalies to identify methods of restoration, and discovers components that allow the restoration method to be carried out, for which the models are also interrogated. The analysis module 240 may optionally be situated at the server side. The installation module 260 is designed to implement software that realizes the restoration method. The database 250 stores the parameters and states, which among other things makes it possible to obtain information by the analysis module 240 as to the processes in the elements and in the system, since a process is a change in the states over time.

At the third side, development modules (not denoted separately in the figure) create descriptions of products (including services), generate models, and send the results to the server side. The development modules may include a framework and other software which formalize a description of products which is easily understood by a human in a format supported by the modules on the server and client side, and which also generate models, including those based on the formalized descriptions, and which send the result to the server side.

The server side provides an interface for communication with the client side 270 and third-party development modules 271. A development infrastructure 280 is realized at the server side which includes at least (not denoted separately in the figure):
 a ranking module,
 a testing module,
 a statistics gathering module.

The ranking module is designed to identify the models which will be sent to the specific client and which will be interrogated by the analysis module. The testing module is designed to check the new models obtained from the development modules. The models are kept in a models database 281. The statistics gathering module receives data from clients according to the collected parameters, the models interrogated, and the results of the interrogation of the models, and generates statistics which are kept in a statistics database 282. The accumulated statistics are used to develop new models, debug existing ones, and so forth, and are accessible across an interface to the developer.

FIG. 1 shows a dynamic system 100 being observed, the core of which is the base element (BE in the figure) on which a client is installed. The base elements may be notebooks, smart watches, smartphones, personal computers, and so on. The base element is linked to other elements in the example via an access point. Thus, the number of elements of the system is determined by the radius of action of the access point in whose coverage the base element is located. In the context of the given system 100, in a particular instance a human may be considered to be an element of the system in the capacity of an object or subject of control/diagnostics/monitoring. In the case when a human is considered to be an object of control/diagnostics/monitoring (for example, the recording of a cardiogram), the other elements of the system are subjects of control. The concept of an anomaly in the context of a human as an element of the system may be defined as a deviation from the normal states of processes in the context of medical requirements.

In another case, a human as well as the environment are considered as being objects of control/diagnostics/monitoring, yet now they are external with respect to the system 100. In this case, the elements of the system collect parameters which are external in accordance with the above classification, and on the basis of these parameters the states and processes of the object of control/diagnostics/monitoring are identified, while the methods of restoration will be identified with respect to the object of control/diagnostics/monitoring, which may be either a human or the environment.

Figure 2B:
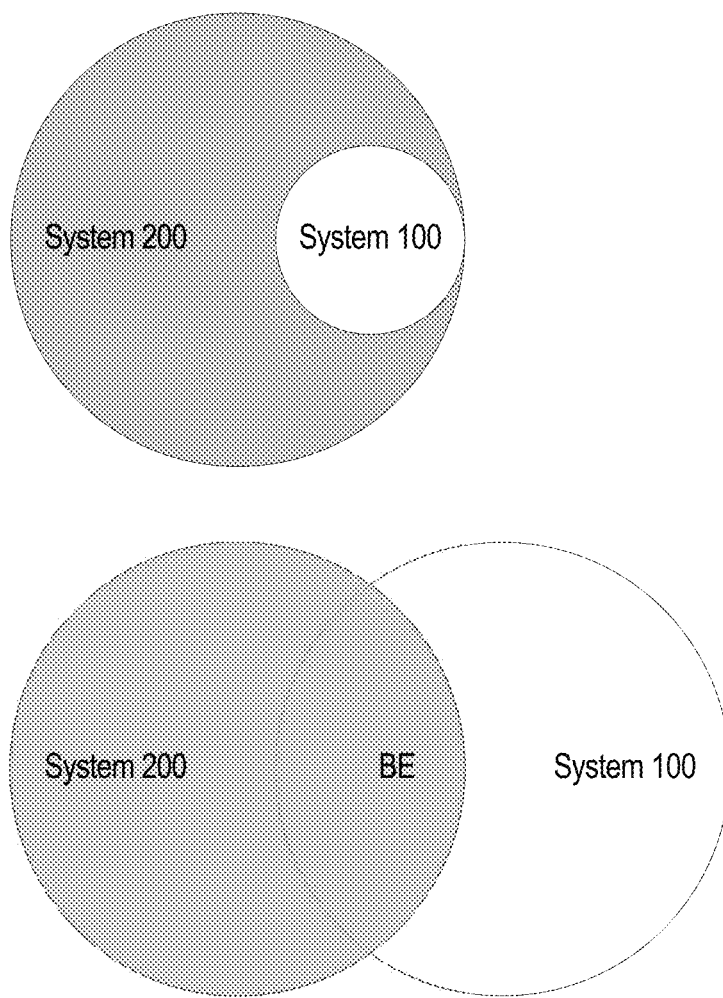
FIG. 2B shows the relations between the system of preventive interaction with a user and the observable dynamic system, according to exemplary aspects of the disclosure.

The relations of the system 200 and the dynamic system being observed 100 are discussed in FIG. 2B. The dynamic system 100 may be either a subsystem of the system 200 or intersect element by element with the system 200, for example, the base element may be a shared portion of the system 200 and of the system 100 (as is shown in FIG. 2B).

Figure 3A:
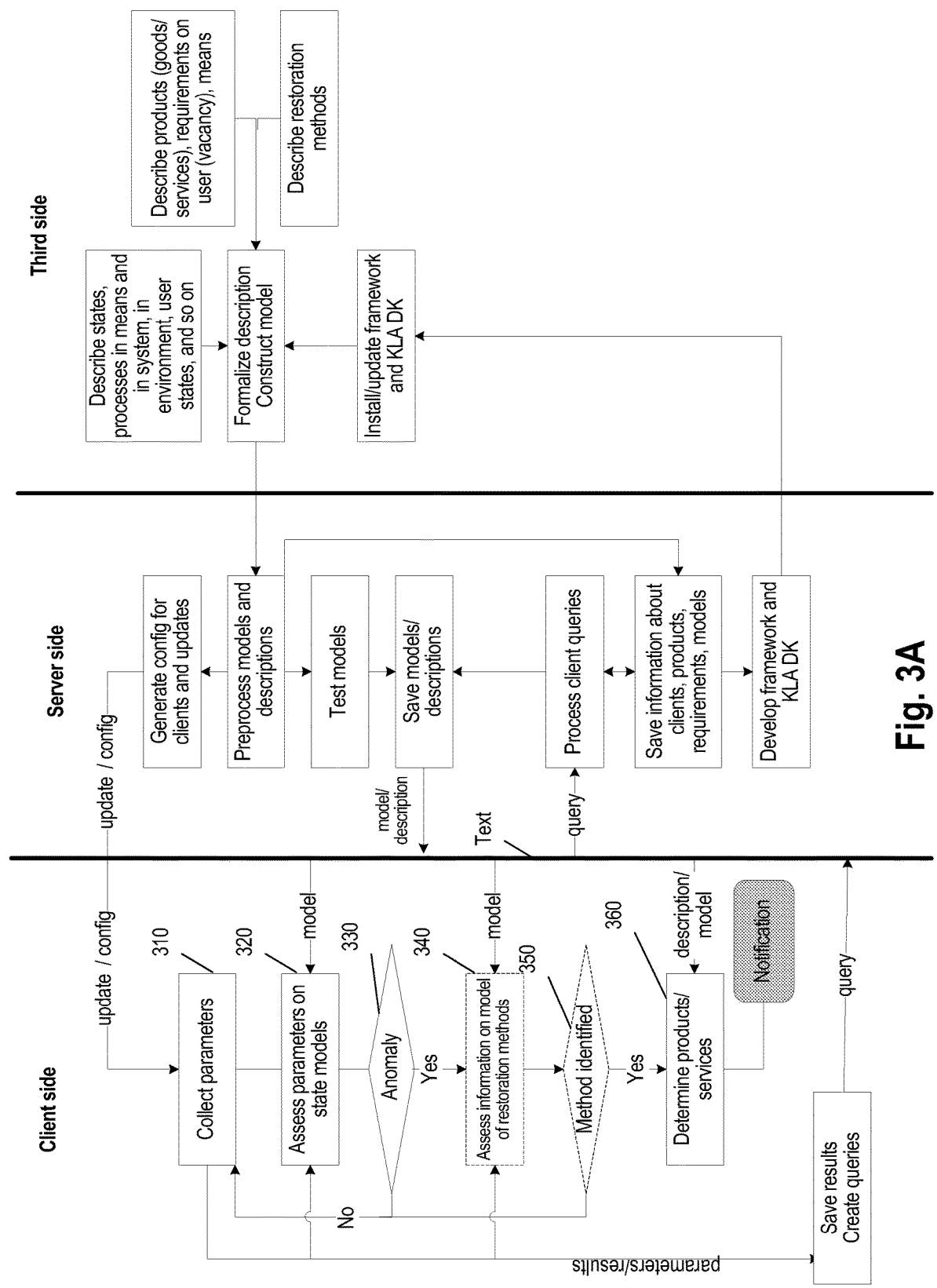
FIG. 3A shows a method of identifying compatible means for systems with anomalies, according to exemplary aspects of the disclosure.

The system 200 is designed to implement the method of selecting of compatible components for systems with anomalies (see FIG. 3A), where the collection module 230 of the client 220 in step 310 collects the parameters of the system 100 from the elements realizing the specified functionality of this system 100. In exemplary aspects, the parameters include structural parameters, describing the makeup of elements of the system and its actual structure and functional parameters, describing the functional organization (the process of functioning) of the system, though other parameters are also contemplated. The gathering of the parameters may for example be done in real time. The gathered parameters are saved in the database 250 of the client 220 and in step 320 they are used by the analysis module 240 of the client 220 to interrogate the state models of the system 100. The analysis module 240, interrogating the state models, assesses the conformity of the state of the system 100 and its elements to the requirements on the system by comparing the collected parameters to the state models. The state models may describe both normal processes and states conforming to the required ones, and anomalous ones, for example those describing a fault state or failure process. The state models may be kept in the database 250 of the client 220. In another particular instance, the state models are presented by the server side by the analysis module 240 of the client 220 on demand. The models describing the states may be highly diverse: regression, classification, categorization and other models. They may be based on decision making trees, neural nets, or logic rules of the type IF (or/and/xor) THEN, and so forth.

In step 330, as a result of the interrogation of the models an anomaly is detected in the system. The anomaly may be at least:
- a state of an element deviating from the required state, and is a function of the parameters of the element;
- a state of the system deviating from the required state, and is a function of the state of an element;
- a process of an element deviating from the required process, and is a time function of the state of the element;
- a process of the system deviating from the required process, and is a time function of the state of the system;
- a state of the environment with which the system is interacting, deviating from the required state and describable by the parameters of the system;
- a process of the environment with which the system is interacting, deviating from the required process and describable by the parameters of the system.

After discovering an anomaly, information about the discovered anomaly is formalized for further processing, where it may be characterized by the class (and/or name) of the anomaly and the system parameters of which the anomaly is a function. In addition, the element of the system whose parameters identify the anomaly may be indicated as a characteristic. The class and name of the anomaly depend on which requirements are being deviated from. Examples of anomalies may be: weak signal of a router, degradation in performance of an element (CPU, HDD, SSD, RAM and so on), insufficient RAM space, data loss/corruption, and so forth. If the anomaly involves a gradual failure, it is not the actual loss of data or shortage of memory volume, for example, that is identified, but rather the imminent occurrence of the anomaly. In a particular instance, the anomaly has the Functionality class (in the FURPS+ classification) and involves, for example, the functioning of the system, where the functioning anomaly is a lowering or loss of the ability of the system or element of the system to perform a function dictated by its design or purpose.

Having detected an anomaly in step 340, and using the information about the anomaly, the model for selecting methods of restoration is interrogated. There may be different models for selecting methods of restoration, as with state models; in a particular instance, descriptive models are used. And as a result of the interrogation of the models, in step 350 the method of restoration is identified which, when implemented, will ensure the conformity of the system and the elements to the requirements, for example, it will ensure the restoration of the required functioning of the system. The method of restoration discovered can both stabilize the anomalous state or process (halt the development of the anomaly, which is useful for gradual failures) and bring about a restoration of the system by switching the element or system from the anomalous state or process to the required one (elimination of the anomaly), where the required state or process conforms to the requirements on the system according to the FURPS+ classification. There can be more than one detected restoration method, in which case the definitive method is chosen on the basis of the user's profile of the base element, which may involve various characteristics: gender, age, location, marketing class, purchasing power (solvency), level of IT literacy, and so forth.

In the final step 360, third-party compatible components are selected (in the general case, the method may select a product instead of a component) realizing the functionality of the restoration method found as a result of the interrogation of the model of restoration methods. Both models and databases may be used for this in which the name of the restoration method corresponds to components that are guaranteed to realize the restoration method. There may be more than one available restoration component, as with the restoration method, in which case the components are chosen based on the user's profile; in addition, the reputation of the manufacturer (vendor) of the restoration components may be taken into account. The selected components can be implemented by various methods in the system, one such method for software being its installation by the client's installation module. Compatibility is determined on the basis of an analysis of the specification of the system or means.

In a particular instance, the restoration methods might not be identified (skipping steps 340 and 350) and the means are identified on the basis of information about the anomaly. In this case, after performing step 330, there is a jump to step 360.

Figure 3B:
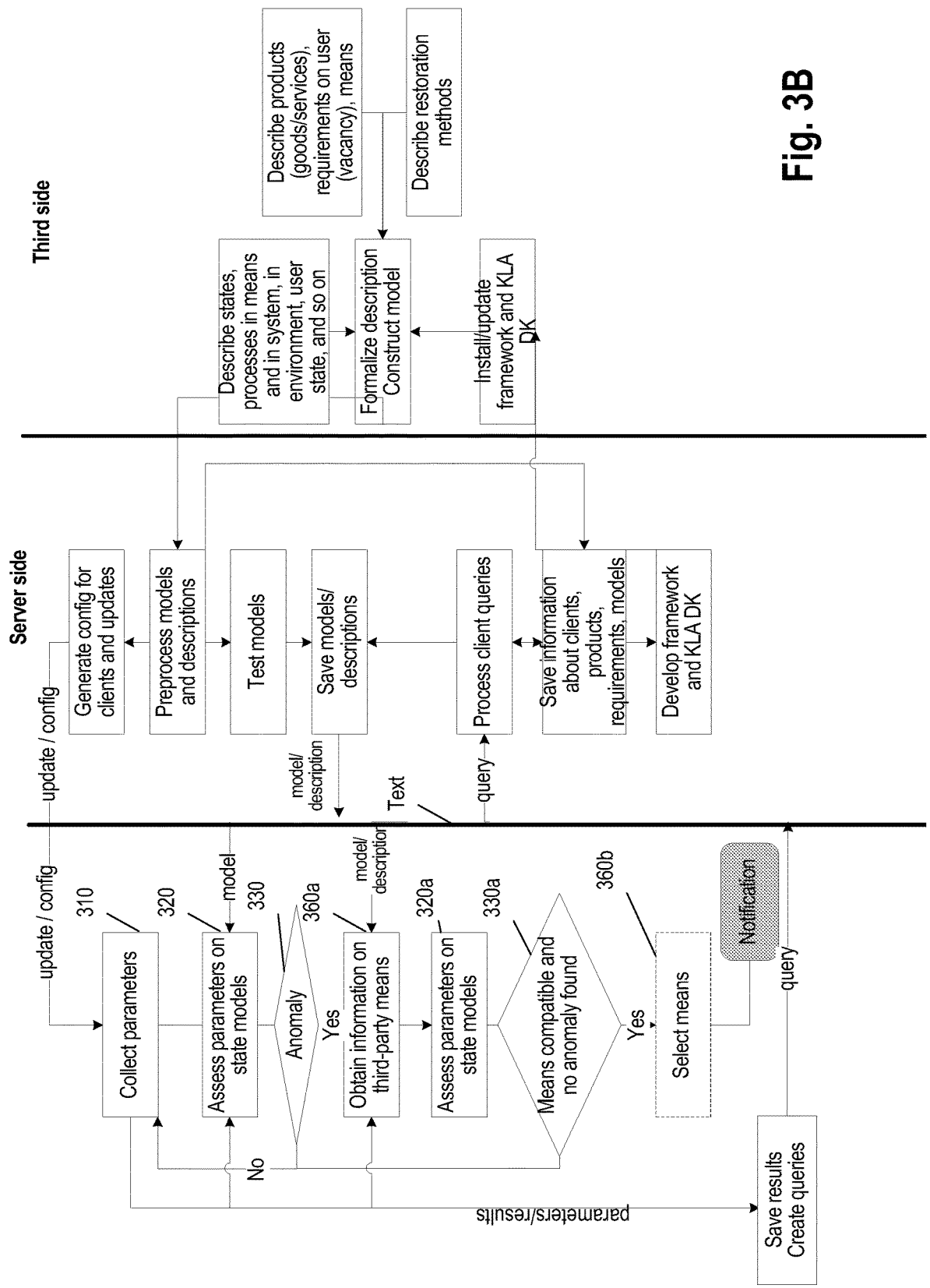
FIG. 3B shows a method of detection of compatible means, according to exemplary aspects of the disclosure.

The above-described method may be carried out in a different way by the system 200 (see FIG. 3B). The steps from 310 to 330 repeat the method described above; then divergences begin. After an anomaly is detected which is characterized at least by parameters of the elements or system of which it is a function, in step 340a a database of available third-party means or information about at least one component is obtained. Next, in step 320a, once again the state model of the system is interrogated using the set of parameters collected in step 310, but in this set the parameters of the system of which the anomaly is a function are replaced by equivalent parameters of the component from the database of available third-party means. On the basis of an interrogation of the state model in step 330a, at least one component is found in the database of third-party means which:
- is compatible with the system; and
- no anomaly is found when interrogating the state model using the parameters of that component as replacement parameters.

In step 330a, more than one component meeting the above criteria may be found. In that case, from the components found, a single component is selected in step 360b in one particular instance, for example, based on the profile of the user of the base element and/or the reputation of the manufacturers/providers of the means found. In another particular instance, the user is notified about all means discovered (the list may first be ranked). The chosen means may be installed either in place of or in addition to the means realizing the element of the system whose parameters identify the anomaly.

Figure 4:
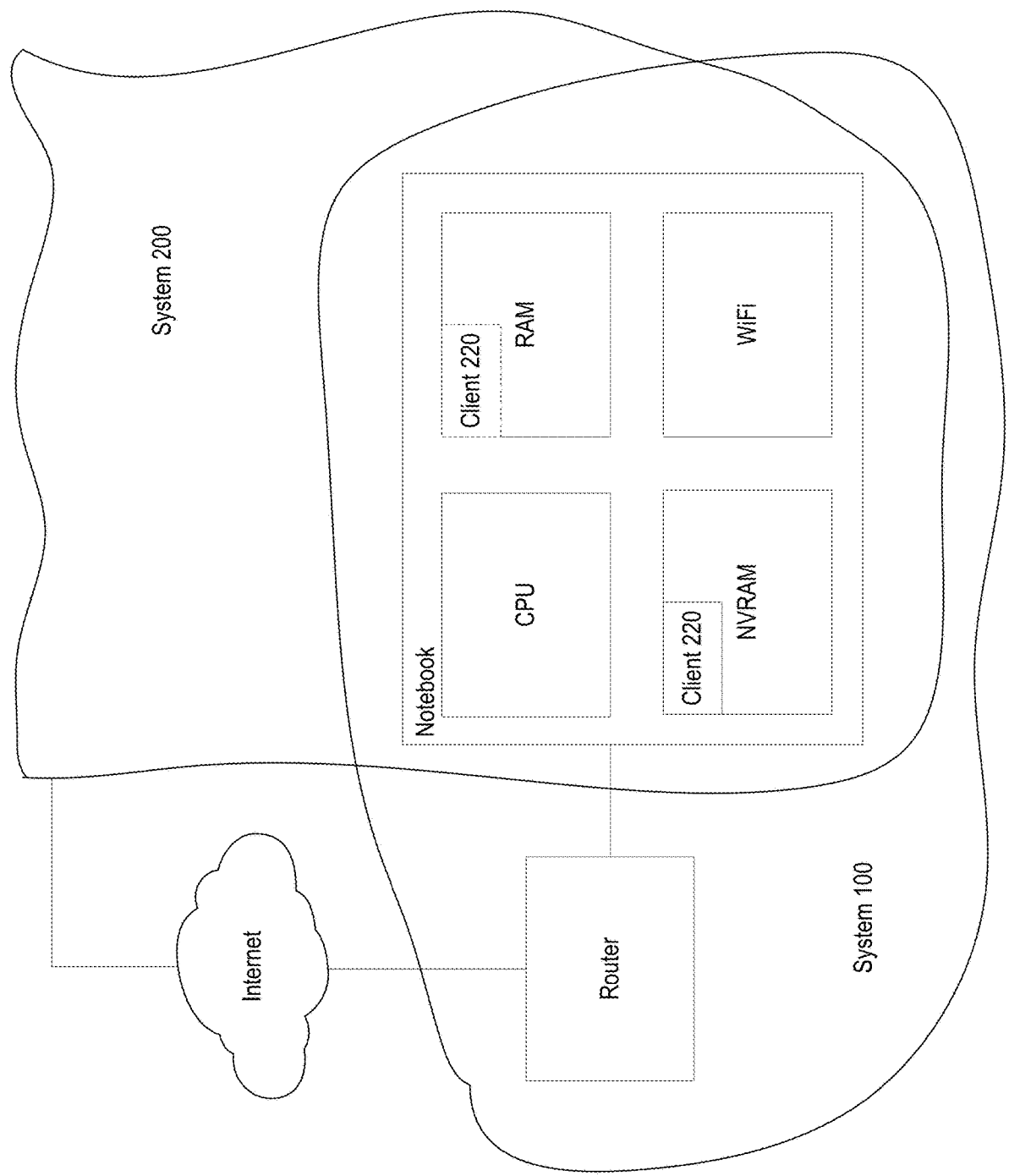
FIG. 4 shows an exemplary embodiment of the disclosure.

For comprehension purposes, let us consider a simplified example (FIG. 4). The client 220 (client software) is installed on a notebook, which in turn is connected to a router. In the terms of the invention, the notebook is the base element 210 and forms, with the other element, the router, the system 100 being investigated. In turn, the base element 210 itself consists of elements, so that the notebook in the context of the investigated system is a subsystem. The client 220 gathers the parameters of the system and of the elements, where the elements are at least the central processor unit, the RAM, a nonvolatile storage device (NVRAM), a wireless communications module and a router. In the present example, the NVRAM is realized by a solid state drive (SSD), while the router is realized by an external router with WPA2 software encryption. The client 220 gathers the following parameters:

SMART attributes of the NVRAM (such as the Reallocated Sector Count);
data on the traffic encryption (yes/no, type of encryption);
the traffic volume in both directions, the traffic density (volume per unit of time);
the channel speed;
the router signal power;
the specification of the means:
NVRAM (type (Type), volume (Value), form factor (FF), interface (Interface));
router (WiFi (IEEE) standard, frequency range of Wi-Fi devices (Spectr), hardware encryption support (HBE))

A table is presented below, aggregating the parameters which are gathered. From this, the state at a moment in time $S_n$, as well as the process $S_n \to S_{n+1} \to \ldots \to S_{n+} \ldots$, may be obtained.

| State | $S_1$ | $S_2$ | $S_3$ | $S_4$ | $S_5$ | $S_6$ | $S_7$ | $S_8$ | $S_9$ |
|---|---|---|---|---|---|---|---|---|---|
| SMART Attribute 05 RSC | 3 | 3 | 3 | 4 | 4 | 5 | 6 | 8 | 25 |
| Encryption Enc | 1 | 1 | 1 | 1 | 1 | 1 | 1 | 1 | 1 |
|  | WEP | WEP | WPA2 | WPA2 | WPA2 | WEP | WEP | WEP | WEP |
| Speed V, Mbit/s | 80 | 82 | 10 | 10 | 10 | 60 | 70 | 80 | 78 |
| Signal P, dBm | 20 | 18 | 20 | 16 | 10 | 11 | 9 | 20 | 18 |
| Time periods T | 1 | 2 | 3 | 4 | 5 | 6 | 7 | 8 | 9 |

The collected parameters are used by the analysis module 240 of the client 220 to interrogate the state models of the system. The analysis module 240, interrogating the state models, assesses the conformity of the state of the system 100 and its elements to the requirements on the system. In the example, simple logical models are used which describe anomalous states of the elements:

IF $V_n \ll V_k$ or $V_n \gg V_k$ THEN SPEED_DEGR describes the state of degradation of the network channel IF $RSC_n < RSC_k < RSC_m$ WHERE $T_n < T_k < T_m$ THEN NVRAM_Sector_DEGR describes the degradation of the NVRAM in the form of a gradual failure of the disk surface, as indicated by an increase in the number of sector reassignment operations, testifying to wear on the surface IF RSC>20 THEN NVRAM_FAULT describes a failure of the NVRAM defined as reaching a critical value of reassigned sectors equal to 20

IF $P_n > P_k > P_m$ and $P_m < 15$ WHERE $T_n < T_k < T_m$ THEN POWER_DEGR describes the state of degradation of the signal power, as indicated a drop in the signal level over time to a critical level of 15 dBm As a result of the interrogation of the models, anomalies are discovered at certain moments in time:
degradation of the network channel at moment in time $T_3$;
degradation of the NVRAM at moment in time $T_6$;
failure of the NVRAM at moment in time Tg;
degradation of the signal power at moment in time $T_5$.

The degradations are anomalous processes, and the failure is an anomalous state. Having information about an anomaly, the models of restoration methods are interrogated (which for this example are also expressed by logical models) and restoration methods are determined:

IF POWER_DEGR THEN AREA_EXTEND—to restore the signal power, it is recommended to extend the radius of effective coverage of the router;

IF SPEED_DEGR WHERE $ENC_n=1$ and $HBE^1=0$ THEN HBE (Hardware Based Encryption)—to restore the speed of the connection, it is recommended to provide hardware encryption support;

IF SSD_FAULT THEN NVRAM_CHANGE—the failure of the NVRAM should be overcome by replacing the means whereby the element is realized, in the present example, by replacing the SSD;

IF ROM_Sector_DEGR THEN NVRAM_CHANGE or BACKUP—having identified degradation of the surface when the means realizing the element is still operational, it is recommended to consider replacing the means and arranging for a backup copying.

Having identified the restoration methods, the components capable of realizing the recommended restoration method are identified. In our example, this is done by a query to the database 283, in which tables are designated in accordance with the restoration methods. Furthermore, a component is chosen which not only realizes the recommended method, but is also compatible with the system being investigated, for which purpose certain conditions (the operator WHERE) generated on the basis of the parameters of the system being investigated are added to the query. The results of performing the queries are presented together with the queries themselves:

SELECT*FROM AREA_EXTEND WHERE Spectr='2, 4' and IEEE='802.11n' and MaxV>80
ZYXEL WRE2206
Tenda A300
NETGEAR EX2700
ASUS RP-AC51
SELECT*FROM HBE WHERE Spectr='2,4' and IEEE='802.11n' and MaxV_WPA2>80
ZYXEL NBG-418N v2
DSL-N16U
MikroTik hAP mini
SELECT*FROM NVRAM_CHANGE WHERE Type='SSD' and FF='M.2', and Interface='PCIe3.0' and Value>128
Intel 600p
Patriot Hellfire
Samsung 960 EVO
SELECT*FROM BACKUP WHERE Type='Remote' and Value>128 and (Trial='Yes' or Free='Yes') and Period='Day' and Scheme='Incremental'
Acronis Disk Director 12
Veeam Agent Free In some aspects, More than one component may be found. Additional filters will then be applied to the means found, taking into account additional characteristics, such as financial solvency of the user, level of IT literacy of the user (not all means are easy to install), willingness of the user to call in a specialist, popularity of the solution among consumers, reputation of the manufacturer/supplier, and so forth.

In a particular instance, the model of restoration methods might not be interrogated, for example, upon triggering of the model:

IF RSC>20 THEN NVRAM_FAULT describes a failure of the NVRAM defined as reaching a critical value of reassigned sectors equal to 20

A query can be made to the database 283, where the table attributes correspond not to restoration methods, as in the above example, but to anomalies:

SELECT*FROM NVRAM_FAULT WHERE Type='SSD' and FF='M.2', and Interface='PCIe3.0' and Value>128

When carrying out the method described in FIG. 3B, after detecting the anomaly:

IF RSC>20 THEN NVRAM_FAULT

Information is obtained as to third-party components compatible with the system 100, that can realize the system element whose parameters identify the anomaly:

SELECT FROM NVRAM WHERE Type='SSD' and FF='M.2', and Interface='PCIe3.0' and Value>128

Among the compatible components found, a component is selected for which the anomaly (RSC>20==False) is not found upon interrogating the state model (IF RSC>20 THEN NVRAM_FAULT) using parameters of the component as substitute parameters. Obviously, in this example, that component will be any properly working component such that the characteristic of a properly working component is an absence of reassigned sectors, in other words, for such means RSC==0.

The system 200 can be used in searches for subjects with qualities (characteristics) corresponding to predetermined requirements. For example, employees to fill vacant positions, respondents (members of focus groups for marketing research or user interface ergonomic studies). The search is performed by previously trained models (job vacancy model); such models may be clusters in multidimensional space, where each cluster brings together descriptions (such as those represented as vectors of parameters of hardware/software) of subjects with similar qualities or characteristics; for example, one cluster brings together descriptions for junior C++ developers, another one, specialists in data science. Another example of a trained model may be a tree whose leaves correspond to classes of specialists, for example, the same junior C++ developer or data science specialist; in other cases, the support vector method (SVM), neural nets, expert systems or any other known method of machine learning may be used. The leaves may also correspond not to a particular class of specialist, but to a certain requirement on the specialist, such as on work experience, or certain key skills.

Figure 5:
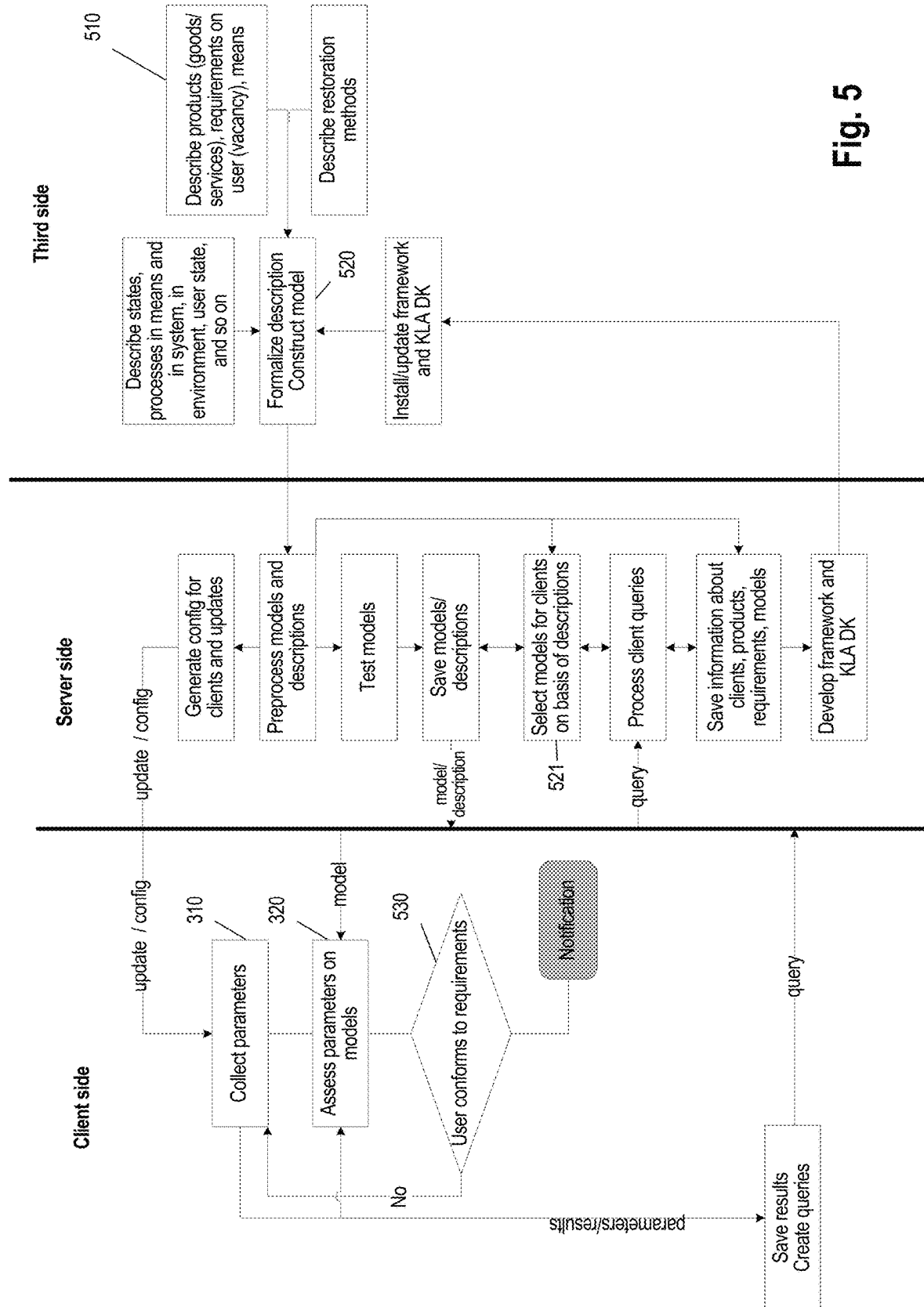
FIG. 5 shows a method of searching for users who correspond to requirements, according to exemplary aspects of the disclosure.

FIG. 5 shows a method of searching for users who meet requirements. The requirements on the users are determined by third parties and described in step 510. The requirements may be described in various forms, from an arbitrary form to a strict form (structured according to a predetermined data format template) within a certain specification. Such requirements, for example on software developers, might be: development experience (length of service, number of successful projects), knowledge of certain syntax of languages, standards, and frameworks, libraries, and so forth.

Next, in a particular instance, the description is formalized in step 520 and a model is constructed. The crux of this step consists in projecting (in a particular instance, mapping) of requirements from the description onto hardware and software parameters. For example, 3 years' service and experience will be transformed into: presence of files with corresponding extension of 3 years' standing, the number of these files, or the time spent in the development environment, the number of publications (jargon: commits) on the specialized resources GitHub® or SourceForge®, the presence of a special tool kit; the knowledge of frameworks will be transformed into the presence of these frameworks on the device and the frequency of accessing them, and so forth. The model will be formed from the projections obtained.

In another particular instance, an already finished model is chosen for the description in step 521, which is expedient when there is no description of the requirements, or the description is incomplete, for example, the requirements only contain the position of a senior C++ developer. The methods of constructing such models are illustrated in FIG. 6. In step 310 the parameters of the hardware and software of the system are gathered and the model constructed in step 520 or selected in step 521 and describing the skills of the user is interrogated using the parameters gathered and the conformity of the user of the device to the requirements is assessed in step 320. If the user of the device conforms to the requirements, the information about this is sent either to a third party or the user himself or herself is notified.

Models trained on previously tagged data may also be used in turn for the formalization of the requirements and the construction of the models in step 520. The tagged data is the hardware and software parameters of the systems whose user attributes are known, in other words, the requirements possessed by those users are known. For example, it is known that the user is a C++ developer in Windows and Linux with 5 years' development experience, and works and with Boost, relational databases, Jenkins. The purpose of training the model is to associate the high-level requirements with the parameters of the hardware and software of the system (low-level requirements).

FIG. 6a shows a method of constructing a formalization model whereby in step 610 parameters of at least one system are obtained. In step 620 the characteristics of the system user are gathered from the elements realizing the functionality of the system. In step 630 the formalization model is trained, where in the training process at least one characteristic of the system user is presented to the input of the model being trained, while the output values are compared to the parameters of the hardware and software of the system to whose user the characteristic corresponds (a variant embodiment of this method is the method of back propagation of errors).

FIG. 6b shows an alternative method of constructing the formalization model, whereby in step 610 parameters of at least one system are obtained, in step 620 the characteristics of the system user are gathered from the elements realizing the functionality of the system, and in step 640 the formalization model is constructed for the association of the characteristics of the system user with the parameters of this system. Regardless of the method chosen for training the formalization model, in the final analysis the characteristic of the user should be projected onto the corresponding hardware and software parameters of the system. The obtained models may be used either independently, or be aggregated, and even work in reverse order.

For example, a requirement is made on a developer: 5 years' development experience and knowledge of Boost; for this, in a particular instance, the model that is used projects the required experience onto the corresponding hardware and software parameters along with a model that identifies which parameters indicate working with Boost. On the basis of the parameters identified, vectors are laid out in multidimensional space—which will in fact be the job vacancy model. These vectors will be compared to the vectors obtained from the parameters gathered from the user's system in step 310. In another instance, if the formalization models constitute decision making trees, no vectors are constructed, and the models are interrogated in step 520 by the parameters gathered in step 310.

It is not always possible to efficiently formulate restoration methods and select components that implement those restoration methods. Sometimes for the training of the models of the restoration methods it is necessary to gather statistics on the change in state of the devices. Therefore, in order to carry out the methods of identifying compatible components, mechanisms are needed which should enable saving of information about anomalous states and processes, if no restoration methods happen to be available for these anomalies. It is also useful to save information about an anomaly for purposes of training the models and to boost the working effectiveness of the means utilizing those models. In another instance, when the selection of the components is made at the server side, it is advisable to formulate a reply to the client in asynchronous mode in order to ensure an optimal functioning of the system.

Figure 7:
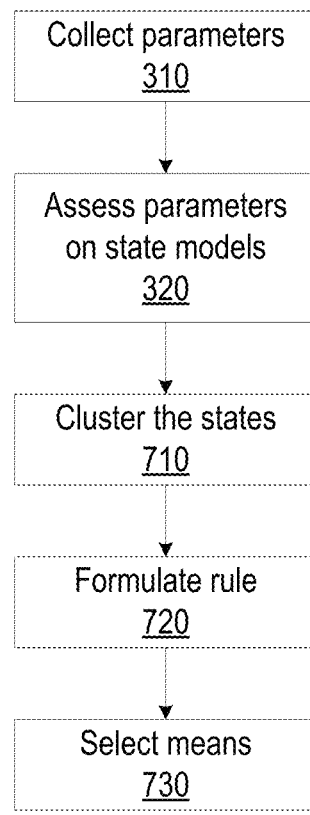
FIG. 7 shows a method of asynchronous selection of compatible means, according to exemplary aspects of the disclosure.

FIG. 7 shows a method of asynchronous selection of components. In step 310, the parameters of the system are obtained from the elements realizing the functionality of the system, where the parameters describe at least two states or two processes of the system. Next, in step 320, the state model of the system is interrogated using the values of the parameters obtained.

Having interrogated the model, in step 710 the states and processes of the system are divided up into anomalous and normal (in other words, the states and processes are clustered according to the criterion of anomalousness), thereby obtaining two groups (two clusters) of states and/or processes for the very same system, and in step 720 at least one rule is formulated for the selection of components on the basis of the parameters of the states/processes of the system from the anomalous cluster. In a particular instance, the rule constitutes a model, which includes the parameters of the components that will eliminate the anomaly when implemented in the system.

In the final step 730, a third-party component is selected from the database of components on the basis of the formulated rule, and when the state model of the system is interrogated using the parameters of this component, the state of the system will not fall into the anomalous cluster. In a particular instance, the selection rule is formulated by comparing the anomalous state of the element or system to the normal state of that same element or system. On the basis of the comparison, parameters are determined of which the anomalous state is a function. These parameters are established with a value corresponding to the normal state, and a query is made to discover means which are capable of ensuring those values.

Modules of the system 200 refers to actual devices, systems, components, a group of components, realized using hardware such as integrated microcircuits (application-specific integrated circuits, ASICs) or a field-programmable gate array (FPGA) or, for example, in the form of a combination of software and hardware such as a microprocessor system and a set of program instructions, and also based on neurosynaptic chips. The functionality of the above modules may be realized exclusively by hardware, and also in the form of a combination, where some of the functionality is realized by software and some by hardware. In certain variant embodiments, the components can be implemented on the processor of a general-purpose computer (such as the one depicted in FIG. 7). The databases may be realized by all possible methods and be contained either on a single physical storage medium or on various media, and be situated either locally or remotely.

Figure 8:
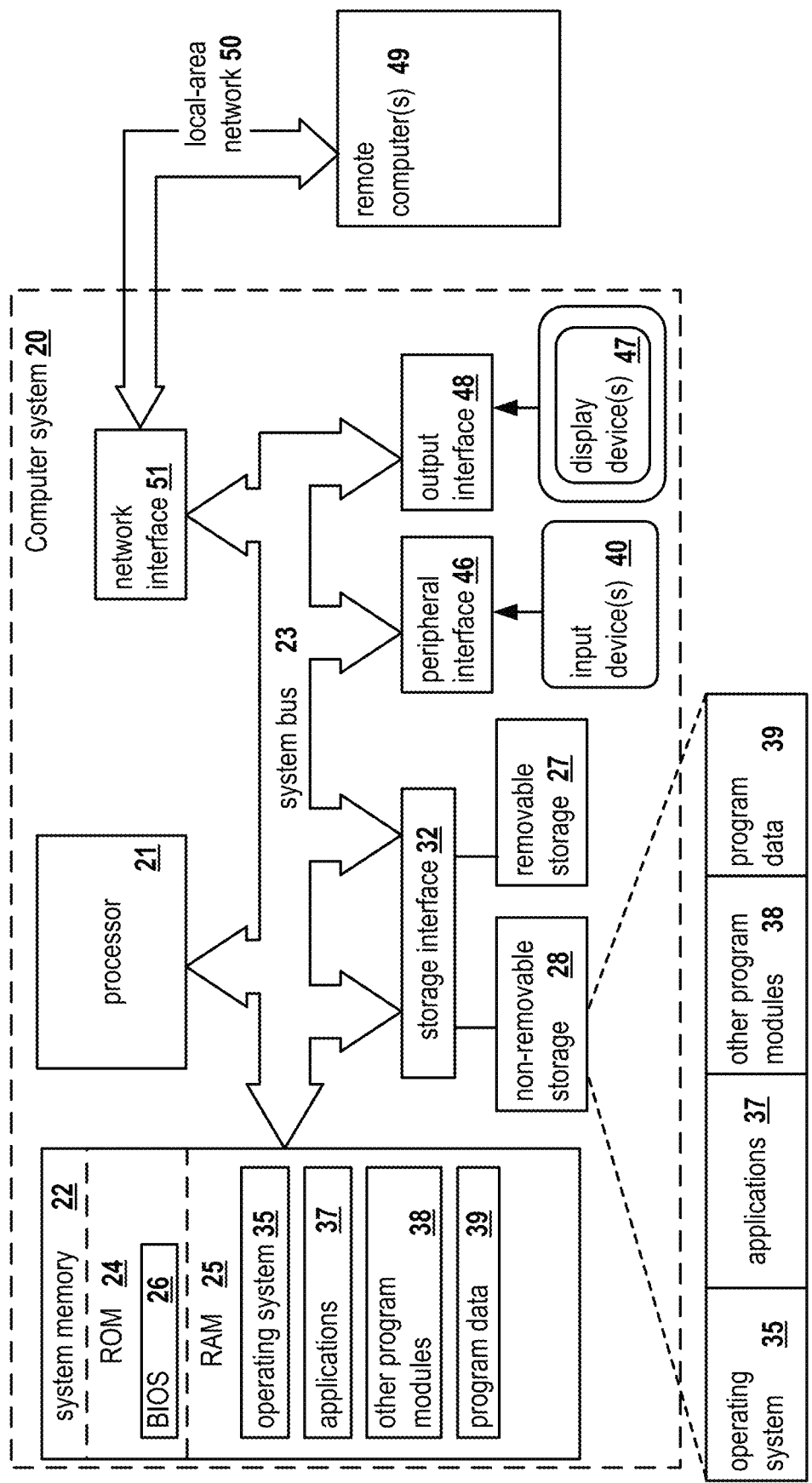
FIG. 8 shows an example of a general-purpose computer system.

FIG. 8 is a block diagram illustrating a computer system 20 on which aspects of systems and methods of asynchronous selection of compatible components in accordance with an exemplary aspect. It should be noted that the computer system 20 can correspond to system 100 for example, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 6, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

The invention claimed is:

1. A method of selection of compatible components for a computer system, comprising:
    collecting parameters of one or more elements of a system, wherein the one or more elements comprise one or more of a router, Central Processing Unit (CPU), Hard Disk Drive (HDD), Solid State Drive (SSD) and Random Access Memory (RAM):
    assessing conformity of the one or more elements of the system with a required state of the system by interrogating one or more state models using the collected parameters, wherein the one or more state models comprises a set of rules for detecting an anomalous state of the element of the system and/or an anomalous process of the element of the system;

identifying one or more anomalies based on the assessment of conformity, wherein the one or more anomalies comprises one or more of: weak signal of a router in the system, degradation in performance of the element of the system including one or more of CPU, HDD, SSD and RAM, insufficient RAM space on the system, and data loss/corruption on the system;

analyzing the one or more anomalies to identify a class and parameters of the system corresponding to the one or more anomalies, wherein the class of the system may comprise one or more of: functional requirements, usability requirements, reliability requirements, performance requirements, and supportability requirements;

identifying components for restoration without identifying restoration methods, based on one or more selection rules configured to compare the anomalous state of the element of the system to a normal state of the element of the system and/or configured to compare the normal process of the element of the system to the anomalous process of the element of the system;

interrogating the one or more state models using parameters of the identified components for restoration, wherein the anomalous state is a function of the parameters of the identified components;

determining at least one component that is compatible with the system, and no anomaly is identified when interrogating the one or more state models using the parameters of the at least one component; and implementing the at least one component in the system to eliminate the one or more anomalies.

2. The method of claim 1, wherein the one or more state models describe normal processes and states conforming to a requirement, and anomalous processes that describe the anomalous state and/or a failure process.

3. The method of claim 1, wherein the one or more state models may be one or more of regression models, classification models, categorization models, models based on decision making trees, neural networks, and/or logic rules.

4. The method of claim 1, wherein the one or more anomalies comprise one or more of: a state of an element deviating from the required state, a state of the system deviating from the required state, a process of an element deviating from the required state, a process of an element deviating from a required process, a process of the system deviating from a required process, a state of an environment with which the system is interacting, deviating from the required state, and a process of the environment with which the system is interacting, deviating from the required process.

5. The method of claim 1, wherein the one or more models of method of restoration are chosen based on a user profile of the base element of the system.

6. The method of claim 1, wherein the base element of the system is a core of the system wherein a client is installed.

7. A computer system of selection of compatible components, comprising:

a processor, configured to:

collect parameters of one or more elements of an observed system, wherein the one or more elements of the observed system comprise one or more of a router, Central Processing Unit (CPU), Hard Disk Drive (HDD), Solid State Drive (SSD) and Random Access Memory (RAM);

assess conformity of the one or more components of the observed system with a required state of the system by interrogating one or more state models using the collected parameters, wherein the one or more state models comprises a set of rules for detecting an anomalous state of the element of the system and/or an anomalous process of the element of the system;

identify one or more anomalies based on the assessment of conformity, wherein the one or more anomalies comprises one or more of: weak signal of a router in the system, degradation in performance of the element of the system including one or more of CPU, HDD, SSD and RAM, insufficient RAM space on the system, and data loss/corruption on the system;

analyze the one or more anomalies to identify a class and parameters of the observed system corresponding to the one or more anomalies, wherein the class of the system may comprise one or more of: functional requirements, usability requirements, reliability requirements, performance requirements, and supportability requirements;

identify components for restoration without identifying restoration methods, based on one or more selection rules configured to compare the anomalous state of the element of the system to a normal state of the element of the system and/or configured to compare the normal process of the element of the system to the anomalous process of the element of the system;

interrogate the one or more state models using parameters of the identified components for restoration, wherein the anomalous state is a function of the parameters of the identified components;

determine at least one component that is compatible with the system, and no anomaly is identified when interrogating the one or more state models using the parameters of the at least one component; and implement the at least one component m the system to eliminate the one or more anomalies.

8. The system of claim 7, wherein the one or more state models describe normal processes and states conforming to a requirement, and anomalous processes that describe the anomalous state and/or a failure process.

9. The system of claim 7, wherein the one or more state models may be one or more of regression models, classification models, categorization models, models based on decision making trees, neural networks, and/or logic rules.

10. The system of claim 7, wherein the one or more anomalies comprise one or more of: a state of an element deviating from the required state, a state of the observed system deviating from the required state, a process of an element deviating from the required state, a process of an element deviating from a required process, a process of the observed system deviating from a required process, a state of an environment with which the observed system is interacting, deviating from the required state, and a process of the environment with which the observed system is interacting, deviating from the required process.

11. The system of claim 7, wherein the one or more models of method of restoration are chosen based on a user profile of the base element of the observed system.

12. The system of claim 7, wherein the base element of the observed system is a core of the observed system wherein a client is installed.

13. A computer-readable medium storing instructions thereon of selection of compatible components for a computer system, the instructions comprising:

collecting parameters of one or more elements of a system, wherein the one or more elements comprise one or more of a router, Central Processing Unit (CPU), Hard Disk Drive (HDD), Solid State Drive (SSD) and Random Access Memory (RAM);

assessing conformity of the one or more elements of the system with a required state of the system by interrogating one or more state models using the collected parameters, wherein the one or more state models comprises a set of rules for detecting an anomalous state of the element of the system and/or an anomalous process of the element of the system;

identifying one or more anomalies based on the assessment of conformity, wherein the one or more anomalies comprises one or more of: weak signal of a router in the system, degradation in performance of the element of the system including one or more of CPU, HDD, SSD and RAM, insufficient RAM space on the system, and data loss/corruption on the system;

analyzing the one or more anomalies to identify a class and parameters of the system corresponding to the one or more anomalies, wherein the class of the system may comprise one or more of: functional requirements, usability requirements, reliability requirements, performance requirements, and supportability requirements;

identifying components for restoration without identifying restoration methods, based on one or more selection rules configured to compare the anomalous state of the element of the system to a normal state of the element of the system and/or configured to compare the normal process of the element of the system to the anomalous process of the element of the system;

interrogating the one or more state models using parameters of the identified components for restoration, wherein the anomalous state is a function of the parameters of the identified components;

determining at least one component that is compatible with the system, and no anomaly is identified when interrogating the one or more state models using the parameters of the at least one component; and implementing the at least one component in the system to eliminate the one or more anomalies.

* * * * *